United States Patent
Mathis et al.

(10) Patent No.: US 6,205,277 B1
(45) Date of Patent: Mar. 20, 2001

(54) DRY CORE OPTICAL FIBER CABLES FOR PREMISES APPLICATIONS AND METHODS OF MANUFACTURE

(75) Inventors: Terry D. Mathis; Wayne M. Newton, both of Lilburn; Jim J. Sheu, Dunwoody; Montri Viriyayuthakorn, Norcross; Carla G. Wilson, Conyers; Mark I. Shmukler, Alpharetta, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/253,412

(22) Filed: Feb. 19, 1999

(51) Int. Cl.[7] ........................................ G02B 6/44
(52) U.S. Cl. .................... 385/106; 385/102; 385/103; 385/104
(58) Field of Search ..................... 385/102, 103, 385/104, 105, 106

(56) References Cited

U.S. PATENT DOCUMENTS

| | | | |
|---|---|---|---|
| 5,249,248 | * 9/1993 | Arroyo et al. | 385/113 |
| 5,268,983 | * 12/1993 | Tatarka et al. | 385/106 |
| 5,389,442 | * 2/1995 | Arroyo et al. | 428/396 |
| 5,751,879 | * 5/1998 | Graham et al. | 385/103 |

* cited by examiner

Primary Examiner—Rodney Bovernick
Assistant Examiner—Sung Pak

(57) ABSTRACT

A preferred embodiment of the dry core optical fiber cable of the present invention incorporates a plurality of sub-units with each of said sub-units being arranged adjacent another of the sub-units so that the plurality of sub-units define an outer periphery. Preferably, each of the sub-units includes a plurality of optical fibers, a yarn layer and a sub-unit jacket, with each of the optical fibers being arranged adjacent another of the optical fibers. The sub-unit jacket surrounds the optical fibers, with the yarn layer being disposed between the optical fibers and the sub-unit jacket. An outer jacket surrounds the plurality of sub-units, with water-blocking tape being disposed between the outer jacket and the outer periphery of the sub-units. A method of manufacture of the cable also is provided.

16 Claims, 6 Drawing Sheets

DRY CORE OPTICAL FIBER CABLES FOR PREMISES APPLICATIONS AND METHODS OF MANUFACTURE

BACKGROUND OF THE INVENTION

1. Field of the Invention

The present invention relates to optical fiber cables used for indoor and/or outdoor premises applications and, in particular, to optical fiber cables which do not incorporate greases and/or gels within the cables for water-blocking.

2. Description of the Related Art

In the wiring of premises, such as apartment and commercial buildings, with fiber optic cables, it is common to use a cabling system in which many cables enter the premises and individual cables are broken out for use in individual stations within the building. Heretofore, it has been known to use a high density breakout cable system for wiring such premises. Typically, the fiber optic cables of such a cable system (known as "breakout cables") are available in spools which can be pulled through the building in a routine manner.

Typically, the prior art breakout cables are constructed with water-blocking properties such as by incorporating greases and/or gels between an outer jacket and internally carried fibers of the cables. The greases and/or gels are intended to prevent water from migrating through and about the fibers of the cable if the outer jacket of the cable becomes breached in some manner. Although meeting with a certain degree of success, cables incorporating the prior art greases and gels can be difficult to work with due to the messiness and handling difficulties thereof For example, the greases and/or gels can tend to leak from the cable, such as during a cable termination process. Additionally, the greases and/or gels are particularly undesirable when exposed to warm temperatures because the warmed greases and/or gels tend to flow more readily within the cable jacket and can tend to drip out of the cable, such as at a cable termination point, thereby potentially soiling or damaging components, i.e. electrical components, found within a cable termination cabinet as well as diminishing the water blocking properties of the cable.

Therefore, there is a need to provide improved fiber optic cables which address these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention generally is directed to dry core optical fiber cables which do not incorporate greases and/or gels for water-blocking. In a preferred embodiment, the cable incorporates a plurality of sub-units with each of said sub-units being arranged adjacent another of the sub-units so that the plurality of sub-units define an outer periphery. Preferably, each of the sub-units includes a plurality of optical fibers, a yarn layer and a sub-unit jacket, with each of the optical fibers being arranged adjacent another of the optical fibers. The sub-unit jacket surrounds the optical fibers, with the yarn layer being disposed between the optical fibers and the sub-unit jacket. An outer jacket surrounds the plurality of sub-units, with water-blocking tape being disposed between the outer jacket and the outer periphery of the sub-units.

In accordance with another aspect of the present invention, an alternative embodiment of the cable incorporates an elongated organizer which possesses a first breaking strength. At least one water-blocking yarn member is arranged about the organizer and a plurality of sub-units are arranged in reverse-oscillated lay about the organizer so that the water-blocking yarn member is disposed between the organizer and the plurality of sub-units. Preferably, each of said sub-units include a plurality of optical fibers, an aramid yarn layer and a sub-unit jacket. Each of the optical fibers possess a second breaking strength, with the first breaking strength being greater than the second breaking strength.

A method aspect of the present invention comprises the steps of: providing at least one water-blocking yarn; wrapping a plurality of sub-units about the water-blocking yarn in a reverse-oscillated lay; wrapping the plurality of sub-units with water-blocking tape; and, forming an outer jacket about the plurality of sub-units and the water-blocking tape so that the water-blocking tape is disposed between the plurality of sub-units and the outer jacket.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1A:
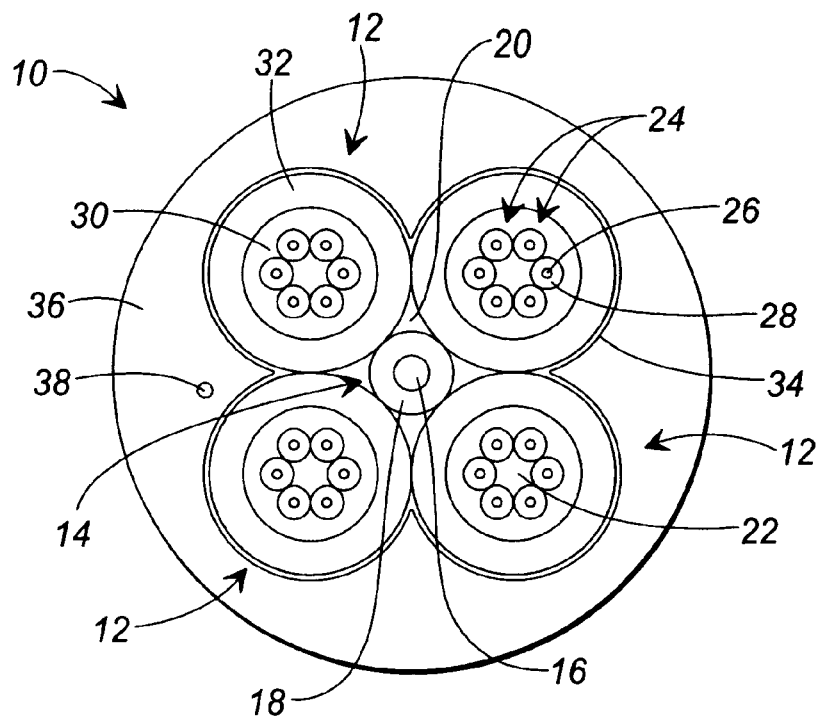
FIG. 1A is a cross-sectional end view of a preferred embodiment of the present invention.
Figure 1B:
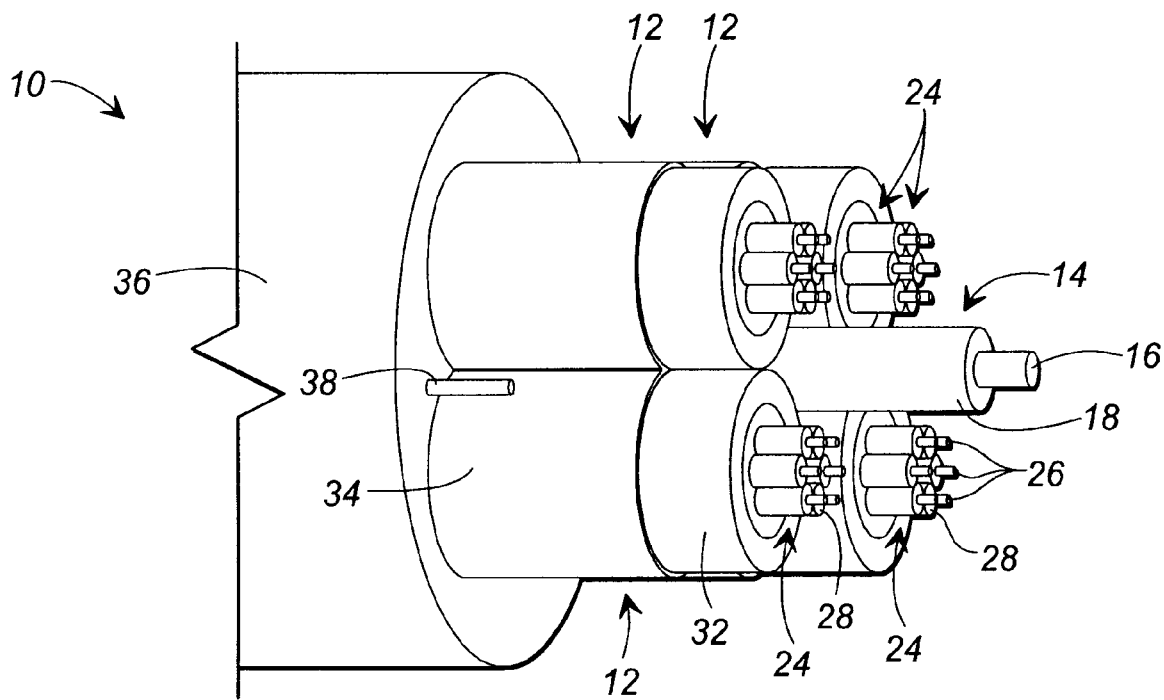
FIG. 1B is a partially cut-away perspective view of the embodiment of FIG. 1A.

Reference will now be made in detail to the description of the invention as illustrated in the drawings, wherein like reference numbers indicate like parts throughout the several views. As shown in FIGS. 1A–1B, a preferred embodiment of the dry core cable 10 of the present invention incorporates a plurality of component cables or sub-units 12 (the term "dry core," as used herein, is defined as a cable configuration which does not incorporate greases and/or gels to promote water-blocking of the cable, as is common in the prior art). Sub-units 12 cooperate to surround an organizer 14, which is flexible to allow the cable 10 to be flexed, such as for winding the cable onto or off of a drum, or for bending the cable along curves in a desired installation path, etc. Organizer 14, however, preferably incorporates a breaking strength which is greater than that of the cable's optical fibers (described in detail hereinafter), and is sufficiently resilient to prevent overbending of the cable, thereby potentially preventing damage to the optical fibers. Organizer 14 includes an inner rod 16 and a outer layer 18, with the rod being formed of a material such as fiberglass and layer 18 being formed of a plastic, such as polyvinyl chloride (PVC), for example. Preferably, rod 16 has a diameter of approximately 0.040 inches, and layer 18 has a radial thickness of approximately 0.023 inches, although the dimensions of the rod and layer can vary depending on the particular application.

In the embodiment of FIGS. 1A–1B, organizer 14 is wrapped with water-blocking yarn member 20, such as water swellable polyester yarn manufactured by Fiberline™, for example. Preferably, yarn member 20 includes two coextensive lengths of water-blocking yarn which are helically wound around the organizer. Four sub-units 12 surround yarn member 20, with the yarn filling the spaces formed between the sub-units and the organizer. So configured, yarn member 20 provides an inner layer of water-blocking protection to the cable.

Each sub-unit 12 includes a central water-blocking aramid yarn member 22 which is preferably composed of 4×2160 denier Kevlar™, although aramid yarn of other numbers of yarn strands, denier or composition types can be used. Six buffered optical fibers 24 surround yarn member 22, with each buffered optical fiber 24 including an optical fiber 26 surrounded by a buffer layer 28. The buffer layer preferably is formed of one or more layers of plastic material, such as nylon (nylon 12), polypropylene or PVC, for example. In preferred sizes, the diameter of each buffered optical fiber 24 is 0.035 inches to comply with U.S. standards, or is 0.020 inches to comply with standards in other countries, such as Japan. Of course, other sizes of the buffered optical fibers 24 can be used. Preferably, buffered fibers 24 are helically wound, or wound with a reverse-oscillated lay, about the yarn member 22. The winding of the buffered optical fibers 24, either helically or in reverse-oscillated lay, about the yarn member 22 ensures that no one buffered optical fiber is subjected to extreme amounts of tension or compression which could damage the optical fibers when the sub-unit is bent.

A water-blocking aramid yarn layer 30 is wrapped about the buffered optical fibers 24. Preferably, yarn layer 30 is formed of 8×2160 denier Kevlar™, although other numbers of aramid yarn strands, denier or composition types of yarn may be used. The optical fibers are held together and protected by a sub-unit jacket 32 formed of plastic material, such as PVC. Preferably the sub-unit jacket is tube-like in shape incorporating a radial thickness of approximately 0.034 inches. So configured, the buffered optical fibers 24 are cushioned on one side by yarn member 22, and cushioned on a side opposite to yarn member 22 by yarn layer 30. This configuration allows for some freedom of movement of the buffered optical fibers 24 to accommodate, for example, flexing of the sub-unit. Moreover, since yarn member 22 and yarn layer 30 are formed of aramid materials, protection from rupture or tearing of, or from shock or impact to, the sub-unit is provided.

Sub-units 12 are wrapped about their outer periphery by a water-blocking tape 34, preferably in the form of laminated water-blocking non-woven polyester tape, manufactured by Lancor, Inc., for example, thus providing an additional layer of water-blocking protection to the cable. An outer jacket 36, formed of plastic material, such as PVC, engages the exterior surface of tape 34, thereby holding together and protecting sub-units 12 and organizer 14. In the embodiment of FIGS. 1A–1B, outer jacket 36 is approximately 0.125 inches thick at its thickest point and approximately 0.050 inches thick at its thinnest point. Outer jacket 36 also incorporates a ripcord 38 which is used for tearing the outer jacket so that the sub-units can be separated from each other and from the organizer, such as during a cable termination process.

Sub-units 12 can be manufactured using a conventional system (not shown) as follows. The yarn member 22 and the buffered optical fibers 24 are advanced from respective spools in a conventional stationary pay-off system, for example, and the aramid yarn layer 30 is formed by drawing aramid yarn strands from respective spools in a feed system and either linearly feeding the aramid yarn strands to surround the advancing buffered optical fibers 24, wrapping the aramid yarn strands about the buffered optical fibers, or helically wrapping the aramid yarn strands about the advancing buffered optical fibers using conventional devices. The yarn member 22, the buffered optical fibers 24 and the aramid yarn layer 30 are then fed to an extruder die for continuous extrusion of sub-unit jacket 32 about the advancing yarn member 22, buffered optical fibers 24 and the aramid yarn layer 30, thereby forming a sub-unit 12.

In operation, the cable 10 can be used in a manner similar, in part, to the use of conventional optical fiber cables. More specifically, for shipment and storage after manufacture the cable 10 can be wound on a drum or spool. During installation, the cable 10 is unwound from the drum or spool and laid along a desired route. For example, the cable 10 can be inserted and advanced into a communication conduit of a building. The ends of sub-units 12 at each end of the cable 10 are then coupled to respective communications coupling equipment or other cables, to couple central offices, networks and computer systems, for example. Unlike many prior art cables, however, when installing the cable 10, the outer jacket 36 of the cable can be stripped without particular care being taken to ensure that the water-blocking constituents of the cable, i.e. greases and/or gels, do not leak or flow from the cable.

In addition, if desirable for a particular application, the plastic materials used in the cable 10 (i.e. buffer layer 28, sub-unit jacket 32, outer layer 18 and outer jacket 36) can be made of a Low Smoke PVC (plenum rated), polyvinyli diene fluoride (PVDF), and DFDA 1638 (plenum rated), in order to meet Underwriter's Laboratories, Inc. (UL) test specifications 910 for a plenum-rating and UL test specification 1666 for a riser rating. Thus, for example, if the sub-units 12 are riser-rated, the cable 10 can be passed through floors of a building and sub-units 12 can be stripped out of the cable 10 and run to respective floors or areas within the building to serve office networks, computer systems, communication equipment and the like in the floors or areas of the building. Because the splicing of optical fiber cables required in the prior art is difficult, tedious and time-consuming, the cable 10 of this invention greatly simplifies and reduces the cost of cable installation relative to many prior art cables. Moreover, by eliminating or reducing the number of splicing operations needed to install an optical fiber cable, the cable 10 of this invention reducing the risk of damage to optical fibers necessarily posed by exposure of optical fibers during splicing. Also noteworthy is that, when the organizer 14 is cut, outer layer 18 shields a technician from the cut end of fiberglass rod 16. Because this end can be extremely sharp and can potentially cause serious injury to a technician, the organizer 14 of this invention greatly improves the safety of a technician when working with the cable 10 of this invention, relative to many prior art cables.

Figure 2:
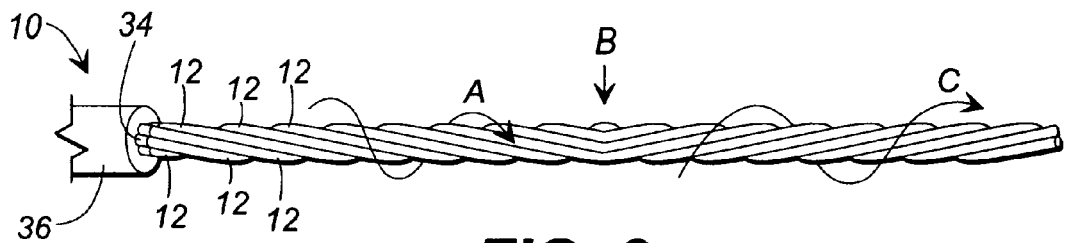
FIG. 2 is a partially cut-away perspective view of the present invention, showing detail of cable construction.

Referring now to FIG. 2, the preferred reverse-oscillated lay of sub-units 12 on the organizer 14 is depicted. As shown in FIG. 2, sub-units 12 twist about organizer 14 in a first rotational direction, e.g. direction A, along the length of cable 10. At position "B" along the length of the cable, the twisting of sub-units 12 is reversed (to the right of position "B," sub-units 12 twist in a direction "C" along the length of cable 10). The twisting of the sub-units 12 distributes tension and compression due to flexing of the cable evenly to all of the sub-units 12, and thus, no one sub-units is subjected to extreme tension or compression when the cable is bent. The reverse-oscillated lay of the sub-units effectively provides the desirable twisting of the sub-units, and yet does not require a planetary pay-off system that would be required if the sub-units were helically-wrapped about organizer 14 along the full length or a significant length of the cable. Thus, the cable of this invention does not require the relatively expensive planetary equipment required for the manufacture of helically-wrapped cables.

Figure 3A:
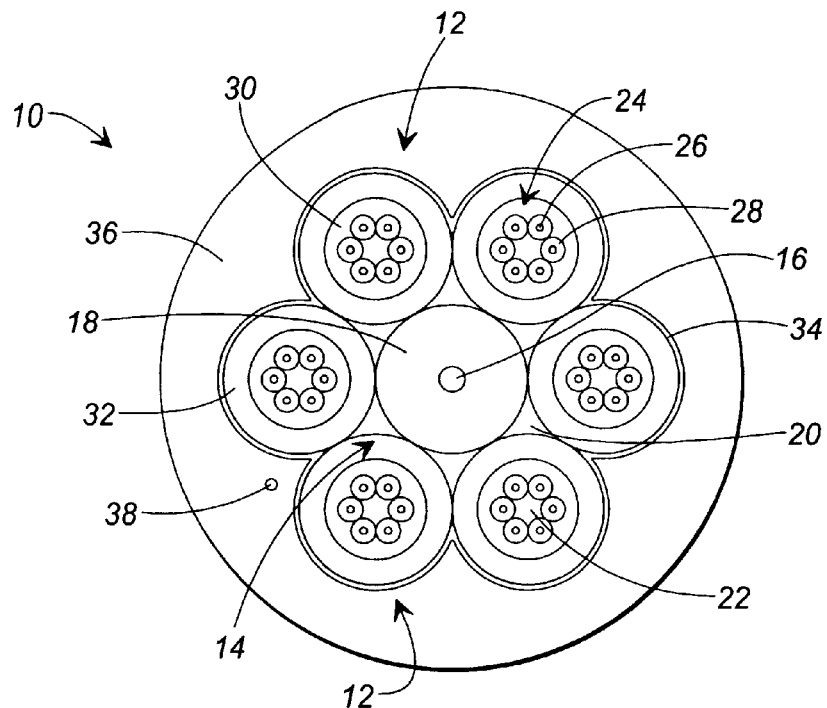
FIG. 3A is a cross-sectional end view of an alternative embodiment of the present invention.
Figure 3B:
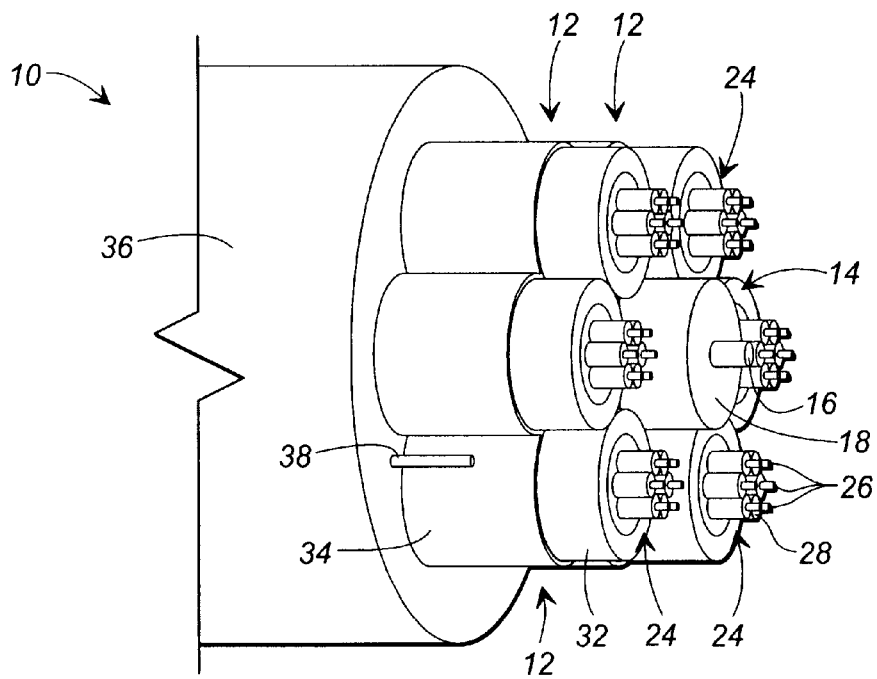
FIG. 3B is a partially cut-away perspective view of the embodiment of FIG. 2A.

As shown in FIGS. 3A—3B, an alternative embodiment of the cable 10 of the present invention is provided which incorporates six sub-units 12 surrounding a organizer 14. As described hereinbefore, the organizer is wrapped with yarn member 20 which is arranged to fill any spaces formed between the organizer and the sub-units. In the embodiment of FIGS. 3A—3B, however, the organizer is configured with approximately the same diameter as that of the sub-units, with the sub-units preferably being wound about the organizer in a reverse-oscillated lay. Because the organizer and the sub-units are roughly the same size in diameter, each sub-unit is supported by two neighboring sub-units and the organizer, thereby providing a uniform and stable cable configuration so that the cable can be exposed to a wide range of temperature variations. As described in relation to the embodiment of FIGS. 1A–1B, the embodiment of FIGS. 3A–3B also incorporates water-blocking tape 34 which is wrapped about the outer periphery of the sub-units, with the sub-units and their surrounding tape being encased by an outer jacket 36. So configured, cable 10 (FIGS. 3A–3B) provides an optical fiber count of 36 as compared to a fiber count of 24 as in the aforementioned four sub-unit embodiment (FIGS. 1A–1B).

Figure 4:
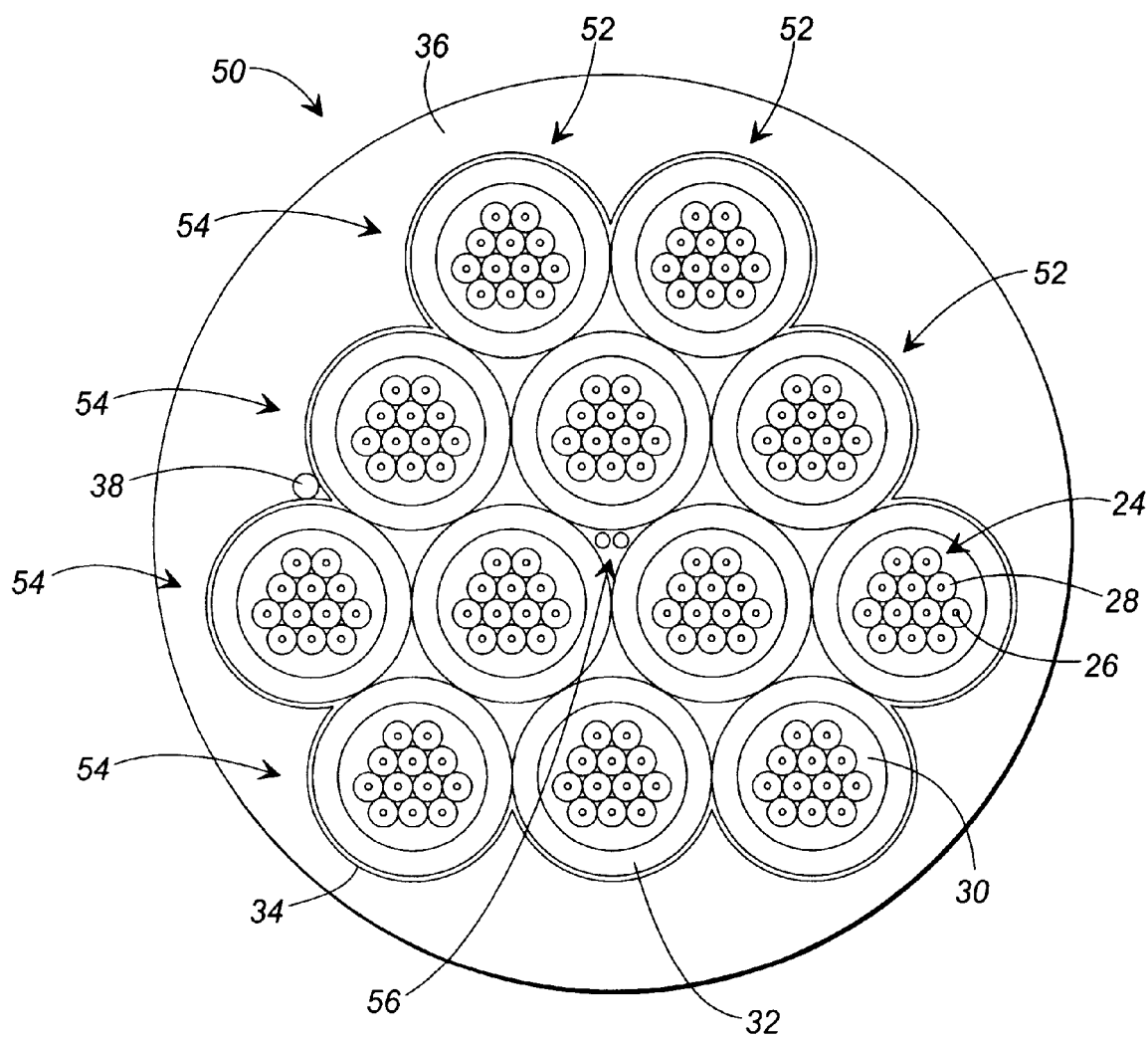
FIG. 4 is a cross-sectional end view of an alternative embodiment of the present invention.

In FIG. 4, a cable 50 in accordance with an alternative embodiment of the present invention is shown. Cable 50 includes twelve sub-units 52 which, as depicted in FIG. 4, are stacked from top to bottom in four horizontal rows 54 of two sub-units, three sub-units, four sub-units, and three sub-units, respectively. Preferably, the sub-units are formed in a reverse-oscillated lay along the length of the cable. Additionally, water-blocking yarn 56 (preferably two coextensive lengths of water-blocking yarn) is incorporated at a central portion of the cable, e.g. between sub-unit rows two and three.

Each sub-unit 52 incorporates twelve buffered optical fibers 24 (described hereinbefore) which, as depicted in FIG. 4, are stacked from top to bottom in four horizontal rows 58 of two buffered fibers, three buffered fibers, four buffered fibers, and three buffered fibers, respectively. Preferably, buffered fibers 24 are helically-wound, or wound with a reverse-oscillated lay.

Additionally, an aramid yarn layer 30 is wrapped about the buffered optical fibers 24. Preferably, yarn layer 30 is formed of 8×2160 denier Kevlar™, although other numbers of aramid yarn strands, denier or composition types of yarn may be used. The optical fibers are held together and protected by a sub-unit jacket 32 formed of plastic material, such as PVC. Preferably the sub-unit jacket is tube-like in shape incorporating a radial thickness of approximately 0.034 inches. So configured, the buffered optical fibers 24 are cushioned by yarn layer 30. Additionally, the sub-units are wrapped about their outer periphery by a water-blocking tape 34. An outer jacket 36 engages the exterior surface of tape 34, thereby holding together and protecting sub-units 52. Outer jacket 36 also incorporates a ripcord 38.

Sub-units 52 can be manufactured using a conventional system as follows. The buffered optical fibers 24 are advanced from respective spools in a conventional stationary pay-off system, for example, and the aramid yarn layer 30 is formed by drawing aramid yarn strands from respective spools in a feed system and either linearly feeding the aramid yarn strands to surround the advancing buffered optical fibers 24, wrapping the aramid yarn strands about the buffered optical fibers, or helically wrapping the aramid yarn strands about the advancing buffered optical fibers using conventional devices. The buffered optical fibers 24 and the aramid yarn layer 30 are then fed to an extruder die for continuous extrusion of sub-unit jacket 32 about the advancing buffered optical fibers 24 and the aramid yarn layer 30, thereby forming a sub-unit 52.

The cable 50 of this invention can be used in a manner similar to that previously described with respect to cables 10.

Figure 5:
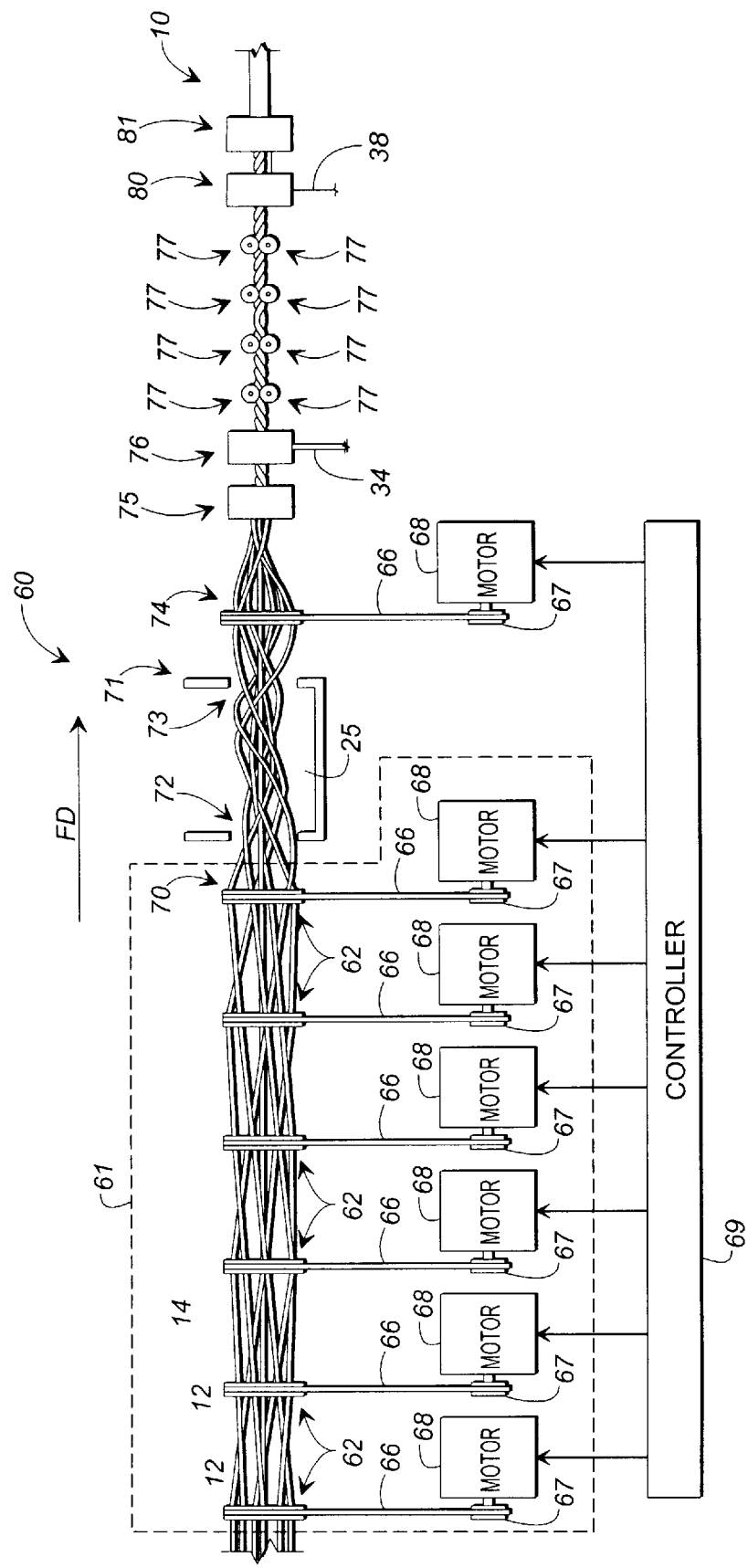
FIG. 5 is a side view of a manufacturing system in accordance with the present invention.

As shown in FIG. 5, a cable manufacturing system 60 of the present invention includes a pay-off system (not shown) which supplies sub-units 12 and organizer 14 to a reverse-oscillated lay (ROL) machine 61. The system 60, as shown in FIG. 5, is configured to manufacture the cable 10 of this invention (shown in 3A–3B), although with minor modifications, system 60 can be used to manufacture cables 10 (shown in FIGS. 1A–1B) and cables 50 (as shown in FIG. 4), as will be subsequently described.

Figure 6A:
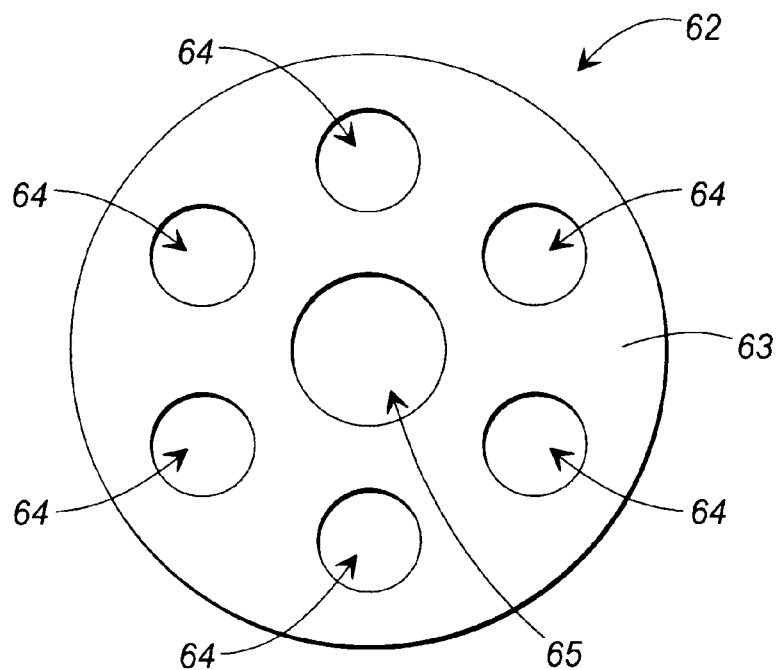
FIG. 6 is a front end view of a plate used in the reverse-oscillated lay machine of the system of FIG. 5.
Figure 6B:
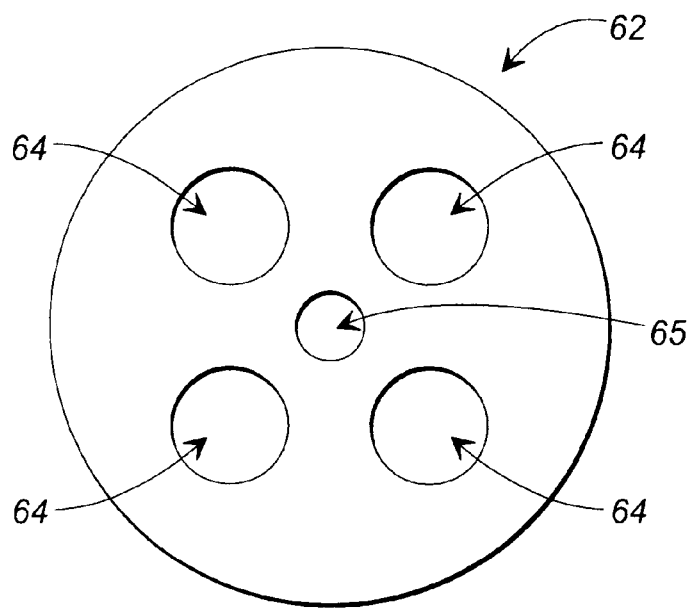

The ROL machine 61 can be one of a wide variety of commercially-available machines, and includes a plurality of plates 62 (FIGS. 6A–6B) which are rotatably mounted and supported in the ROL machine 61. Preferably, each plate 62 includes a circular or disk member 63 defining apertures 64 which correspond in number to the total number of sub-units 12 to be included in the cable 10. In FIG. 6A, six sub-units 12 can be fed through respective apertures 64, such as for forming cables 10 of the embodiment of FIGS. 3A–3B. In FIG. 6B, four sub-units 12 are accommodated, such as for forming cables 10 of the embodiment of FIGS. 1A–1B. Apertures 64 are defined at equal angular intervals relative to a center or rotational axis of the disk member 63. At its center, disk member 63 defines an aperture 65 through which passes organizer 14, which has been previously wrapped with yarn member 20. In the ROL machine 61, disk member 63 can be supported by one or more bearings (not shown) coupled between the front and/or rear circumferential edges of disk member 63, and the frame of the ROL machine 61.

As shown in FIG. 5, plates 62 of ROL machine 61 receive sub-units 12 through respective apertures 64, and also receive organizer 14 through aperture 65. Endless belts 66 are looped about the circumferential side edges of plates 62, and respective drive pulleys 67. Drive pulleys 67 are mechanically coupled to and driven to rotate by respective motors 68, with the motors being electrically coupled to a controller 69. The controller generates and outputs signals to respective motors 68 to control the direction (clockwise or counterclockwise) and speed of rotation of the motors, and hence also the rotation direction and speed of plates 62. The controller also generates signals to control respective motors 68 to rotate the plates in a predetermined phase relationship. For example, the controller can control the plate furthest downstream along the feed direction, e.g. direction "FD" (this plate will be referred to hereinafter as the "exit plate 70") to rotate in a counterclockwise direction relative to the front ends of plates 62 and exit plate 70, for a predetermined number of rotations over a time period predetermined for the feed speed of the sub-units 12 to the ROL machine 61 from the feed system. After exit plate 70 is driven by the controller to rotate in the counterclockwise direction for the predetermined number of revolutions of the exit plate, the controller generates and outputs the signal to motor 68 to reverse the rotation direction of the exit plate, and to control motor 68 to rotate the exit plate in the clockwise direction for the predetermined number of revolutions. The controller continues to drive the exit plate alternately in the clockwise and counterclockwise directions, each for the predetermined number of revolutions as long as organizer 14 and sub-units 12 continue to be fed to the ROL machine 61.

Rotation of the first plate 62 immediately upstream relative to the feed direction of exit plate 70 is controlled similarly to exit plate 70, but delayed in phase by a predetermined amount relative to the motion of the exit plate. The next plate 62 upstream from this plate 62, i.e. the second plate 62 upstream relative to the feed direction from exit plate 70, is rotated in a manner similar to the plate 62 which is the first upstream of the exit plate 70 relative to the feed direction, but it is delayed in phase by the predetermined amount from first plate 62. Similarly, the third plate 62, which is the third in position upstream relative to the feed direction from exit plate 70, is delayed by three times the predetermined phase amount from the motion of exit plate 70. Similarly, the fourth plate 62, which is the fourth in position upstream from exit plate 70 relative to the feed direction, is delayed by four times the predetermined phase amount relative exit plate 70, with the fifth plate 62 upstream from exit plate 70 lagging the motion of exit plate 70 by five times the predetermined phase amount. Thus, the plates 62 are rotated by controller 69 in a manner which twists sub-units 12 about organizer 14 in a reverse-oscillated lay.

From exit plate 70, the sub-units 12, yarn member 20 and organizer 14 are fed to an applicator 71 which defines entrance and exit apertures 72, 73 through which the sub-units 12, yarn member 20 and organizer 14 are fed along the feed direction. The applicator 71 contains the slick substance 25, such as powered talc, which is applied or dusted on the the sub-units 12, yarn member 20 and organizer 14. A follower plate 74 is disposed downstream along the feed direction from the applicator 71. The follower plate 74 can be the same in configuration as the plates 62 (including exit plate 70) of the ROL machine 61. Like each plate 62, the follower plate 74 is rotatably mounted to a frame (not shown) with, for example, one or more bearings attached between the front and/or rear circumferential edges of the follower plate 74 and the frame that supports the follower plate 74 in position to receive the sub-units 12, yarn member 20 and organizer 14 from the applicator 71. The follower plate 74 can be driven by an endless belt 66 looped about the circumferential side edge of the follower plate 74 and a drive pulley 67 coupled to a motor 68. The motor 68 which drives the follower plate 74, is coupled to receive from controller 69 the same or substantially the same control signal as that received by the motor 68 that drives the exit plate 70. Importantly, follower plate 74 is thus driven in-phase with exit plate 70 and so preserves the reverse-oscillated lay of the sub-units about the organizer. From the follower plate 74, the sub-units 12, yarn member 20 and organizer 14 advance to a sizing die 75 which can be of any conventional variety. Sizing die 75 defines a tapering or semi-torodial aperture which constricts the sub-units into contact with the organizer.

Figure 7:
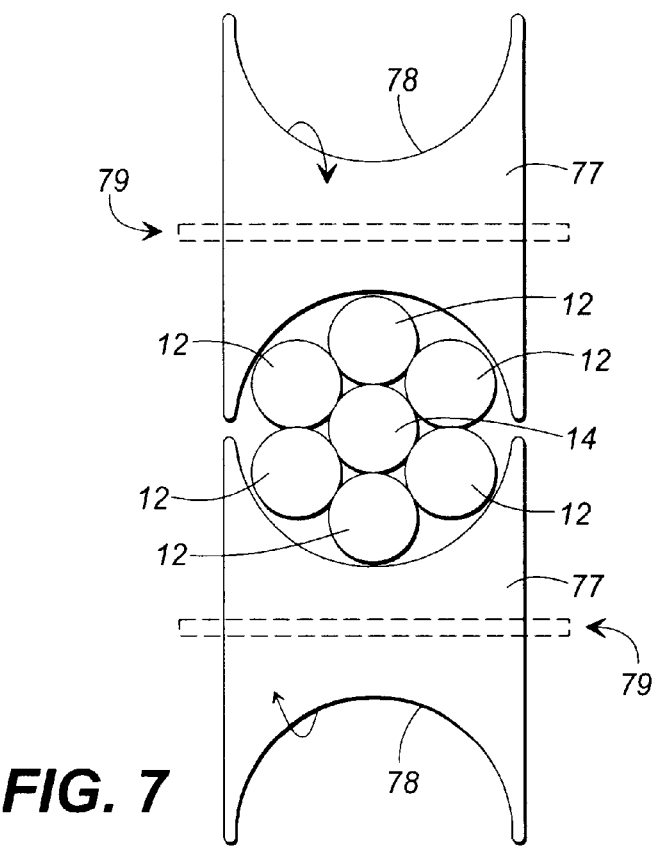
FIG. 7 is a front end view of a pair of opposing rollers in accordance with the present invention, showing a cable in cross-section advancing between the rollers.

From the sizing die 75, the sub-units 12, yarn member 20 and organizer 14 advance along the feed direction to a tape applicator 76. Tape applicator 76 receives a continuous feed of tape 34 which is applied to the outer periphery of the sub-units, such as in an overlapping and spiraling configuration or an overlapping longitudinal configuration, along the length of the sub-units. From the tape applicator 76, the taped sub-units 12, yarn member 20 and organizer 14 advance along the feed direction to at least one pair of rollers 77. The rollers 77 are supported by a frame (not shown) which holds the ends of roller axles 79 to support the rollers 77 in position to receive the sub-units 12, yarn member 20 and organizer 14 as they are driven along the feed direction. As shown in FIG. 7, when viewed from the front (e.g. looking at the rollers 77 from a perspective upstream of the rollers 77 along the feed direction), the rollers 77 include circumferential surfaces 78 which are convex and symmetrical about the respective rotational axes of the rollers 77 through which pass respective axles 79 to support the rollers 77. The taped sub-units 12, yarn member 20 and organizer 14 pass between opposing circumferential surfaces 78 of the rollers 77. The pair of rollers 77 engage with taped sub-units and roll on the axles 79 as the taped sub-units 12, yarn member 20 and organizer 14 are driven along the feed direction. The rollers 77 then feed the taped sub-units 12, yarn member 20 and organizer 14 to a ripcord applicator 80. The ripcord applicator receives a continuous feed of ripcord 38 which is arranged adjacent the taped sub-units. The ripcord, taped sub-units, yarn and organizer are then fed to a die 81 which extrudes molten plastic material about the ripcord, taped sub-units, yarn and organizer to form outer jacket 36.

Figure 8:
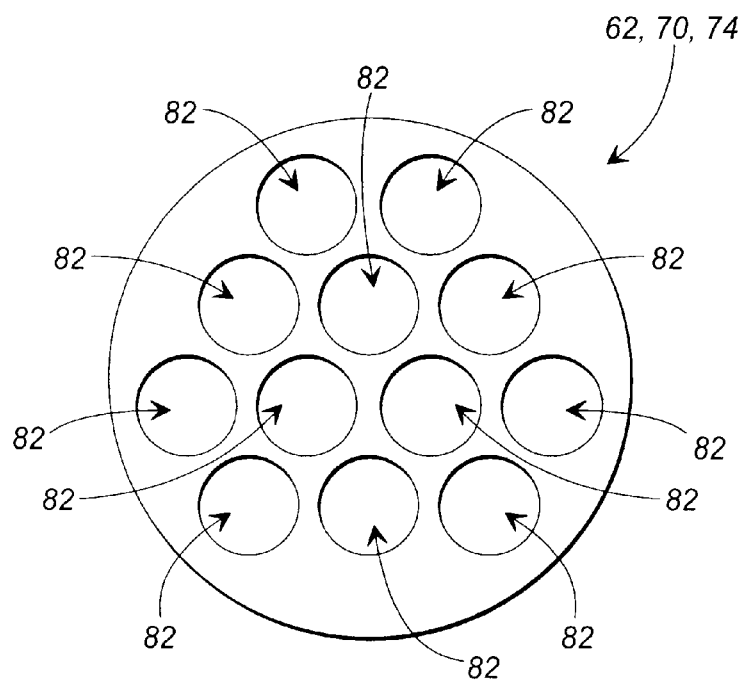
FIG. 8 is a front end view of a plate used in the reverse-oscillated lay machine of the system of FIG. 5.

The system 60 can be readily modified to manufacture the cables 50 of FIG. 4. Specifically, the plates 62, exit plate 70 and follower plate 74 are configured as shown in FIG. 8 to define a plurality of apertures 82, preferably twelve, through which are fed respective sub-units 52. In other respects, the structure and operation of the system 60 used to make the cable 50, is similar to that used to make the cables 10.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

We claim:

1. A dry core optical cable comprising:
a plurality of sub-units, each of said sub-units arranged adjacent another of said sub-units such that said plurality of sub-units define an outer periphery, each of said sub-units comprising:
a plurality of optical fibers, a yarn layer and a sub-unit jacket, each of said optical fibers arranged adjacent another of said optical fibers, said sub-unit jacket surrounding said optical fibers, said yarn layer disposed between said optical fibers and said sub-unit jacket;
a second yarn member surrounded by said plurality of sub-units;
an elongated organizer disposed within said second yarn member;
an outer jacket surrounding said plurality of sub-units; and
water-blocking tape disposed between said outer jacket and said outer periphery of said plurality of sub-units.

2. The cable of claim 1, wherein said yarn layer comprises water-blocking aramid yarn.

3. The cable of claim 1, wherein said plurality of optical fibers surround a first yarn member.

4. The cable of claim 1, wherein each of said optical fibers is a buffered optical fiber.

5. The cable of claim 1, wherein said plurality of sub-units comprises at least four of said sub-units.

6. The cable of claim 3, wherein said first yarn member comprises a water-blocking aramid yarn.

7. The cable of claim 1, wherein said organizer has a glass rod and an outer layer of plastic formed about said glass rod.

8. The cable of claim 6, wherein said second yarn member comprises water-blocking yarn.

9. The cable of claim 8, wherein said second yarn member is helically wound about said organizer.

10. A dry core optical cable comprising:
an elongated organizer having a first breaking strength;
at least one water-blocking yarn member arranged about said organizer;
a plurality of sub-units arranged in reverse-oscillated lay about said organizer such that said water-blocking yarn member is disposed between said organizer and said plurality of sub-units, each of said sub-units arranged adjacent another of said sub-units, each of said sub-units comprising: a plurality of optical fibers, a water-blocking aramid yarn layer and a sub-unit jacket, each of said optical fibers having a second breaking strength and being arranged adjacent another of said optical fibers, said sub-unit jacket surrounding said optical fibers, said water-blocking aramid yarn layer disposed between said optical fibers and said sub-unit jacket, said first breaking strength being greater than said second breaking strength;
an outer jacket surrounding said plurality of sub-units; and
water-blocking tape surrounding and in contact with said outer periphery of said plurality of sub-units and disposed between said outer jacket and said outer periphery of said plurality of sub-units.

11. The cable of claim 10, wherein said plurality of optical fibers surround a water-blocking aramid yarn member.

12. The cable of claim 10, wherein each of said optical fibers is a buffered optical fiber.

13. The cable of claim 10, wherein said plurality of sub-units comprises at least four of said sub-units.

14. A method of manufacturing dry core optical fiber cable comprising the steps of:
providing at least one water-blocking yarn;
providing an elongated organizer;
wrapping said water-blocking yarn about said organizer;
wrapping a plurality of sub-units about said water-blocking yarn in a reverse-oscillated lay, each of said sub-units comprising:
a plurality of optical fibers, a yarn layer and a sub-unit jacket, each of said optical fibers arranged adjacent another of said optical fibers, said sub-unit jacket surrounding said optical fibers, said yarn layer disposed between said optical fibers and said sub-unit jacket;
wrapping said plurality of sub-units with water-blocking tape; and
forming an outer jacket about said plurality of sub-units and said water-blocking tape such that said water-blocking tape is disposed between said plurality of sub-units and said outer jacket.

15. The method of claim 14, wherein the step of providing said elongated organizer comprises providing said elongated organizer having a glass rod and an outer layer of plastic formed about said glass rod; and wherein the step of wrapping said water-blocking yarn comprises wrapping said water-blocking yarn about said outer layer of said organizer.

16. The method of claim 14, wherein the step of forming an outer jacket comprises extruding a plastic outer jacket about said plurality of sub-units and said water-blocking tape.

* * * * *